United States Patent [19]
Pinto

[11] Patent Number: 4,689,236
[45] Date of Patent: Aug. 25, 1987

[54] METHOD FOR FORMING EDIBLE PRODUCTS HAVING AN INNER PORTION ENVELOPED BY A DISSIMILAR OUTER PORTION

[75] Inventor: Albert A. Pinto, White Plains, N.Y.

[73] Assignee: Nabisco Brands, Parsippany, N.J.

[21] Appl. No.: 795,717

[22] Filed: Nov. 7, 1985

Related U.S. Application Data

[63] Continuation of Ser. No. 540,981, Oct. 11, 1983, abandoned, which is a continuation-in-part of Ser. No. 507,401, Jun. 24, 1983, abandoned.

[51] Int. Cl.4 .............................. A21D 6/00; A23P 1/12
[52] U.S. Cl. .................................... 426/502; 426/503; 426/516; 426/94; 425/133.1
[58] Field of Search ................ 426/94, 502, 516, 549, 426/517, 518; 425/133.1, 130, 131.1

[56] References Cited

U.S. PATENT DOCUMENTS

3,572,259  3/1971  Hayashi ........................... 425/209
4,075,356  2/1978  Thulin ............................. 426/502
4,259,051  3/1981  Shatila ............................ 426/94
4,469,475  9/1984  Krysiak .......................... 425/133.1

Primary Examiner—Raymond N. Jones
Assistant Examiner—Marianne M. Cintins
Attorney, Agent, or Firm—Richard Kornutik

[57] ABSTRACT

Dough pieces for a baked product having an inner portion enveloped by a dissimilar outer portion are disclosed which are formed by continuously extruding two dissimilar materials to form an extrudate rope having a core of one material and an outer tube of the other material, depositing the extrudate rope on a continuously moving conveyor, and dividing the extrudate rope upon the conveyor by displacing the core material away from spaced transverse zones, sealing the outer tube to itself along the zones and severing the sealed tube.

10 Claims, 26 Drawing Figures

METHOD FOR FORMING EDIBLE PRODUCTS HAVING AN INNER PORTION ENVELOPED BY A DISSIMILAR OUTER PORTION

CROSS REFERENCE TO RELATED APPLICATION

This is a continuation of co-pending application Ser. No. 06/540,981, filed on Oct. 11, 1983, now abandoned, which is a continuation-in-part of U.S. Ser. No. 507,401 filed June 24, 1983, now abandoned.

BACKGROUND OF THE INVENTION

The present invention relates to the manufacture of edible products having dissimilar inner and outer portions, and, more particularly to the manufacturer of such products in which the inner portion is enveloped by the outer portion.

The types of products to which the present invention relates includes baked goods that are baked from dough pieces having an outer layer of farnacious dough and a core which may be a dissimilar dough or another material such as a jam, cream, puree, paste, or other extrudable form of fruit, cheese, meat, vegetable, confection or other edible substance. In those products where the core is also a dough, the inner and outer doughs would be dissimilar in composition so as to produce different tastes, colors, appearances, textures, consistencies, or the like in the inner and outer portions of the baked product.

In the past, products of this type have been formed from laminated sheets in which two dough layers are separated by a layer of filling material. This approach is used in the method disclosed in U.S. Pat. No. 3,494,302 wherein the laminated sheet is divided transversely and longitudinally into rectangular dough pieces. The product produced by the method and apparatus of the patent is danish pastry. If such an apporach were used to produce products using doughs which spread during the baking process, like soft cookie doughs, the individual rectangular pieces would have to be separated in both the longitudinal and transverse directions to prevent the dough pieces from fusing together during baking. It would, of course, require extra labor or machinery to effect such separations.

The laminated sheet approach is not suitable for producing products having the round configuration associated with most conventional cookies. To achieve a round baked product, the dough piece must be round or substantially round, depending on the extent to which the dough spreads during baking. To cut round dough pieces from a dough sheet produces a high proportion of scrap. In the production of round unfilled cookies and crackers, the scrap is mixed back into the dough so there is no waste. However, this cannot be done when the dough sheet is a laminate of different materials. The scrap from such a laminate contains some of such material, and to mix it into either of the materials in quantity would change the character of that material and blur the distinction between the outer and inner portions of the baked product.

Another approach to forming products having different inner and outer portions, is disclosed in U.S. Pat. No. 3,572,259. In this approach, the two materials are concentrically extruded and the extrudate rope is divided and formed into concentric dough balls by a pair of rotating wheels having spirally configured peripheries. The apparatus shown, while effective for use in small bakeries, has a limited production capacity and requires a relatively large floor area for its capacity.

The typical band oven used in large commercial bakeries carries up to 18 rows of two inch diameter cookies. The machine of the patent under discussion is capable of producing only a single row of dough pieces. Therefore, 18 of these machines would be required to fill a modern high production oven. Also, it would be necessary to provide a system of conveyors to carry the dough pieces from the machines and deposit them in a regular pattern on the band of the oven.

SUMMARY OF THE INVENTION

Accordingly, it is an object of this invention to provide an improved method and apparatus for producing baked goods and baked goods dough pieces in which a center portion of one material is totally enveloped by an outer layer of another material.

Another object is to produce such baked goods and dough pieces in a fast and efficient manner.

Another object is to produce such baked goods and dough pieces by dividing an extrudate composed of continuously coextruded dissimilar materials providing an inner core and an outer tube.

Another object is to produce such dough pieces by dividing ropes of such extrudate positioned on horizontal conveyors.

Another object is to provide improved baked products wherein a center portion of one material is uniformly covered by an outer layer of a different material.

The foregoing objects are accomplished by continuously coextruding two dissimilar materials to provide an extrudate rope composed of an inner core and an outer tube of different materials, depositing the extrudate rope on a continuously moving horizontal conveyer, dividing the extrudate rope into individual dough pieces by displacing the inner core material away from a pair of space zones extending transversely of the extrudate rope, sealing the outer tube to itself along the zones, and severing the outer tube within the zone.

BRIEF DESCRIPTION OF THE DRAWINGS

Preferred embodiments of the invention have been chosen for purposes of illustration and description and are shown in the accompanying drawings, forming a part of the specification, wherein.

DESCRIPTION OF THE PREFERRED EMBODIMENT

Figures 1, 15, 16, 17:
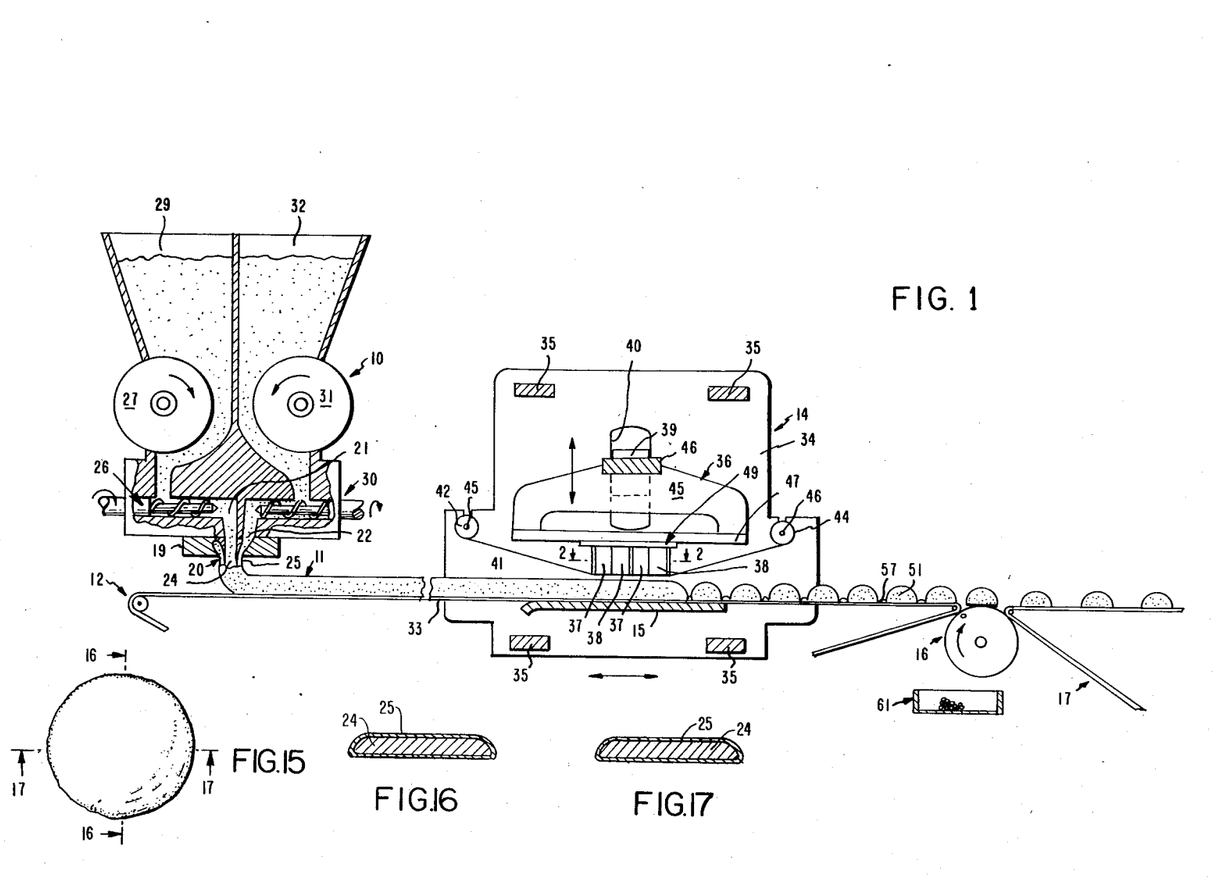
FIG. 1 is a side elevational view, partly in section, schematically illustrating apparatus in accordance with the present invention.
FIG. 15 is a plan view of a baked cookie made in accordance with the present invention.
FIG. 16 is a sectional view taken along lines 16—16 on FIG. 15.
FIG. 17 is a sectional view taken along line 17—17 on FIG. 15.

Referring to the drawings, and particularly to FIG. 1 thereof, there is shown apparatus according to the present invention which generally includes an extruder 10 producing an extrudate rope 11 of two dissimilar materials arranged concentrically, a conveyor 12 carrying the extrudate rope 11 away from the extruder 10, a reciprocating cutter mechanism 14 positioned above the conveyor, a backing plate 15 positioned beneath the conveyor at the cutting location, a transfer wheel mechanism 16 at the end of the conveyor 12, and a second conveyor 17 extending from the transfer mechanism 16 toward a baking oven (not shown) and moving faster than the conveyor 12.

The conveyor 12 may be of any width, and normally is equal in width to that of the band of the oven which it feeds. A typical oven band width is 42 inches. In apparatus according to the present invention, a conveyor of that width could accommodate 18 parallel extrudate ropes spaced across the width thereof.

The extruder 10 extends across the entire width of the conveyor and includes a die block 19 which provides a plurality of coextrusion dies 20 (for example, 18 in number) of conventional design which are spaced across the conveyor. Each of the dies 20 have an inner port 21 and an outer port 22. A filler material is fed to the inner port 21 of each die and is extruded as the core portion 24 of the extrudate ropes 11. A dough is fed to the outer port 22 of each die and is extruded as the outer tube portion 25 of the ropes 11.

The inner ports 21 of the dies 20 are fed by individual screw extruder 26. All of the extruders 26 are fed by a single serrated feed roll 27 from a hopper 29. The outer ports 22 of the dies are fed by individual screw extruders 30. All of the extruders 30 are fed by a single serrated feed roll 31 from a hopper 32. The feed rolls 27, 31 and the hoppers 29, 32 extend across the width of the conveyor 12.

The screws of the extruders 26 are each driven to provide the same rate of flow of inner material to their respective dies. In like manner the screws of the extruders 30 are each driven to provide the same rate of flow of outer material to each of the dies. Typically, the set of extruders 26 and the set of extruders 30 would each be driven by separate motors, each motor driving its respective set of extruders through a gear train. The drive motors would typically be provided with speed controls to vary the rate of flow of the inner and outer materials independently.

The conveyor 12 includes a cotton fabric conveyor belt 33 which extends from the extruders and passes beneath the cutter 14.

The cutter 14 includes a pair of vertical plate members 34 interconnected by transverse bars 35. The cutter 14 is mounted on pivoted legs (not shown) and is reciprocated horizontally parallel to the conveyor belt 33. A die head 36 carrying cutter blades 37 and 38 is mounted between the plates 34 for vertical reciprocating movement. The die head 36 is provided with a slide block 39 that is slideably positioned in a vertical slot 40 formed in each of the plate members 34.

The reciprocating motions of the cutter 14 are such that the die head 36 is moving horizontally at the velocity of the conveyor belt 33 during the time the die is in engagement with the extrudate ropes 11.

A thin rubber web 41 is positioned between the cutter blades 37, 38 and the extrudate ropes 11. The web extends from a supply roll 42 to a take-up roll 44. The rolls 42 and 44 are respectively wound around rods 45 and 46 that extend between the plates 34. In the preferred embodiment, the web 41 is a latex rubber sheeting of between 6 and 9 thousandths of an inch in thickness.

As the die head 36 moves downwardly, it carries the rubber web toward the dough sheet. When the cutter blades 37, 38 are pressed into the extrudate ropes 11, the web stretches and conforms to the contours of the blades. Upon upward movement of the die head, the web contracts to its original flat configuration and insures positive separation of the cut dough pieces from the cutter blades. When the blades begin to cut through the rubber web, the rods 31 and 32 are manually rotated to bring a fresh section of web under the die.

The die head 36 is mounted between the slide blocks 39 by means of a plurality of arc formations 45 joined to a bar 46 which is carried by the blocks 39. A bolster plate 47 is bolted to the arc formation 45 and a cutter die 49 carrying the blades 37, 38 is bolted to the bottom of the bolster 47.

Figure 2:
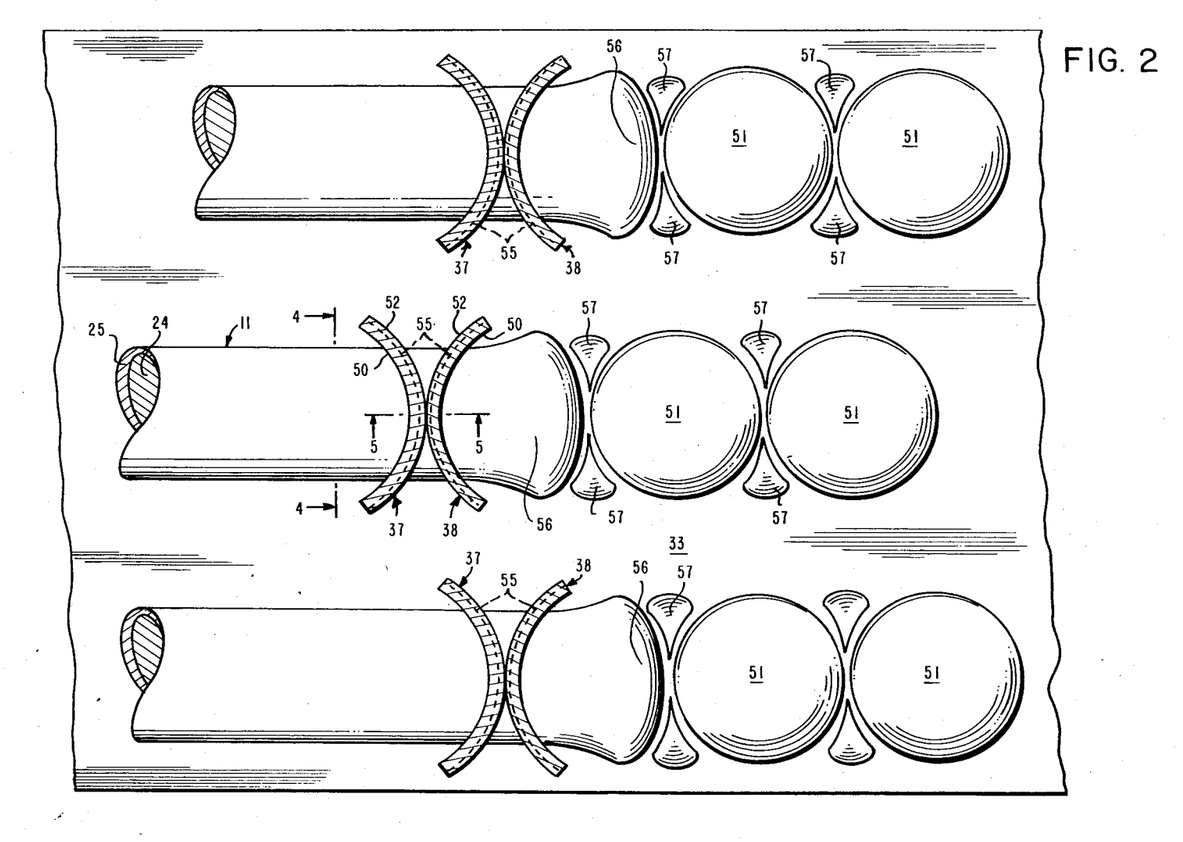
FIG. 2 is a plan view taken along line 2—2 on FIG. 1 with the rubber web removed to show the extrude rope in various stages of division.
Figure 4:
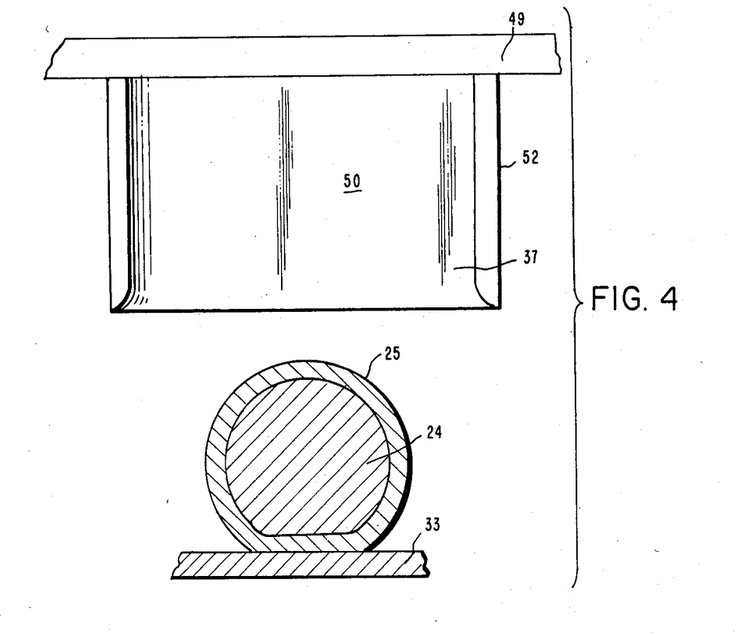
FIG. 4 is a sectional view taken along line 4—4 on FIG. 2 showing the cross section of the extrudate rope.
Figure 5:
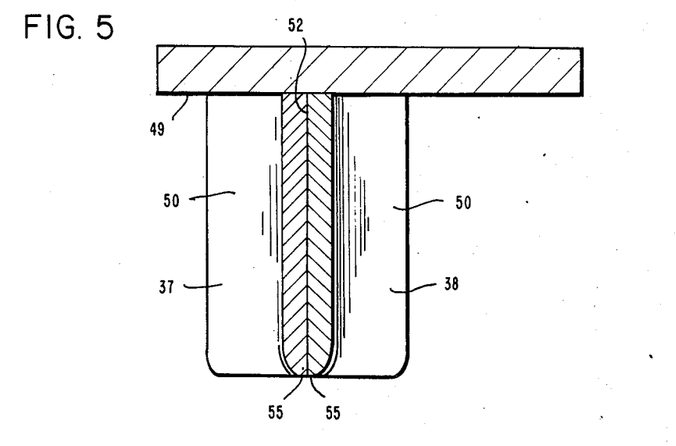
FIG. 5 is a sectional view taken along line 5—5 on FIG. 2 showing a cross section of the knife blades.
Figure 6:
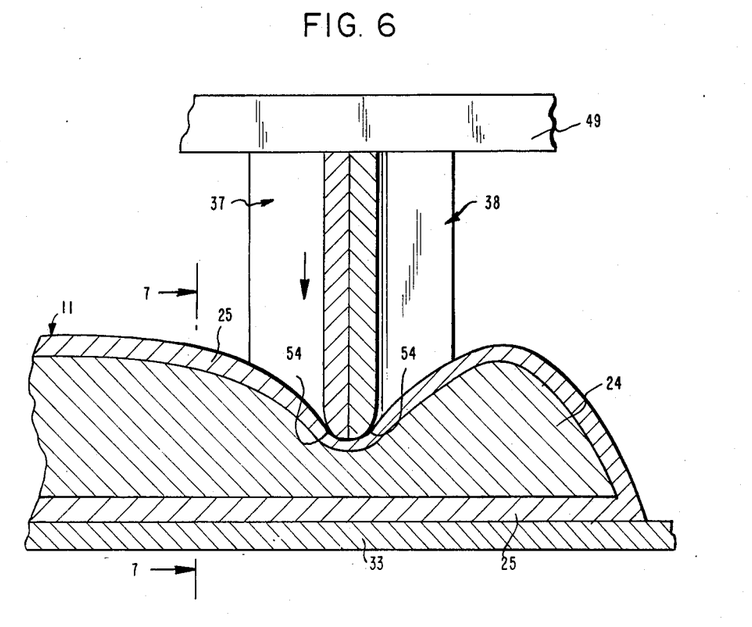
FIG. 6 is a longitudinal sectional view of the extrudate rope and knives showing the effect of the knives on the extrudate rope during the dividing operation.

Referring now to FIGS. 2, 4 and 5, a pair of blades 37, 38 are positioned over each extrudate rope 11. The blades 37, 38 extend transversely with respect to the ropes 11. They are joined back to back at the centerline of the rope and curve away from each other. The blades 37 are curved to provide a concave surface 50 facing in the upstream direction toward the extruders. The blades 38 are curved so that its concave surface 50 faces downstream toward the oven. Both blades 37, 38 extend well past the edge of the rope 11 on both sides thereof. As shown in FIG. 2, the sets of blades are staggered so that the dough pieces 51, formed by the operation of the cutter blades, are positioned in staggered rows. During the baking process, the dough pieces spread outwardly in all directions and, therefore, they must be separated by a sufficient distance to prevent them from spreading into each other. The dough pieces in each row are separated along the line or the row as they are transferred to the conveyor 17 which runs at a faster rate. The staggering of the dough pieces in adjacent rows provides the necessary lateral separation while allowing closer row spacing than would otherwise be possible.

In cross section, as seen in FIG. 5, the convex surfaces 52 of the blades extend vertically from top to bottom. The concave surfaces 50 are formed with a tip section 54 that curves inwardly to a narrow flat surface or land 55 on the edge of the blade.

In a preferred embodiment, the blades are $\frac{1}{8}$ inch thick, have a land 55 which is 1/64 inch wide, and the surfaces 50, 52 are curved in concentric circular arcs, the radius of the arc of the surface 52 being $\frac{7}{8}$ inch. In this embodiment the central orifice of the die 20 is round having a diameter of 11/16 inch and the outer orifice is 1 inch in diameter and spaced $\frac{1}{4}$ inch below the inner orifice. The extrudate rope has a diameter of about 15/16 inch as a result of a slight stretching action, and the spacing of the cut lines along the center line of the ropes 11 is $1\frac{3}{8}$ inches. The dough pieces formed under these conditions are substantially circular, measuring approximately $1\frac{1}{4}$ inches long and $1\frac{1}{4}$ inch wide, and being about $\frac{3}{4}$ inch in height. These dough pieces bake out to be approximately two inches in diameter and about $\frac{3}{8}$ inch thick at the center. The round central orifice of the die 20 enables the use of an inner core material containing large discrete particles, such as chocolate chips, to be extruded.

Figure 7:
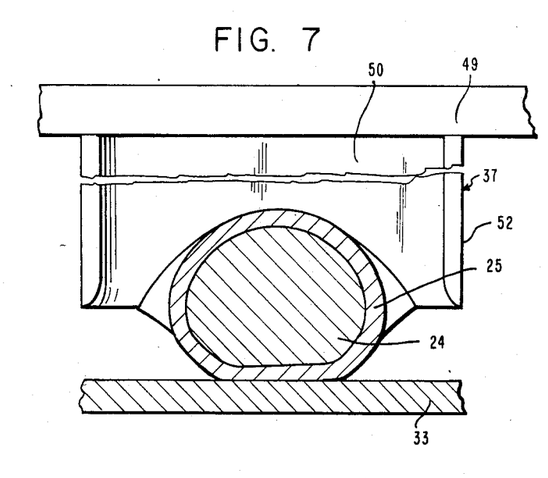
FIG. 7 is a sectional view taken along line 7—7 on FIG. 6 further illustrating the effect of the knives during the dividing operation.
Figure 8:
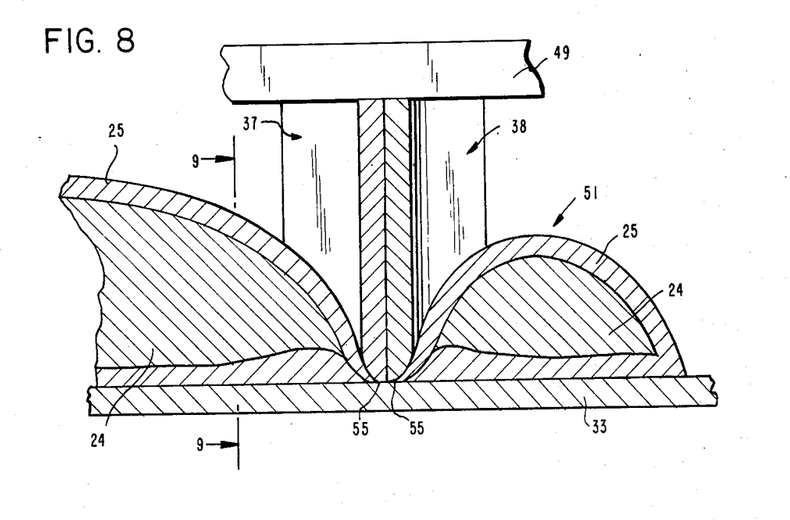
FIG. 8 is a longitudinal sectional view similar to FIG. 6 showing the completion of the dividing operation.

In FIGS. 6 to 9, a set of blades 37, 38 are shown moving downwardly against and through the extrudate rope 11 to form a dough piece and seal the cut end of the rope. As the blades descend pinching the extrudate rope (FIG. 6), the rope flows outwardly along the concave surfaces of the blades (FIG. 7). The blunt edges of the blades 37, 38 press the upper part of the outer tube downwardly displacing the core portion 24. The upper portion of the outer tube 25 is thus pressed into the lower portion of the tube, sealing the tube 25 to itself along two curved zones on the belt 33 defined by the blades 37, 38. The tube 25 is severed within the sealed area by the lands 55 to separate the newly formed dough piece 51 from the sealed end 56 of the extrudate rope 11.

Figure 9:
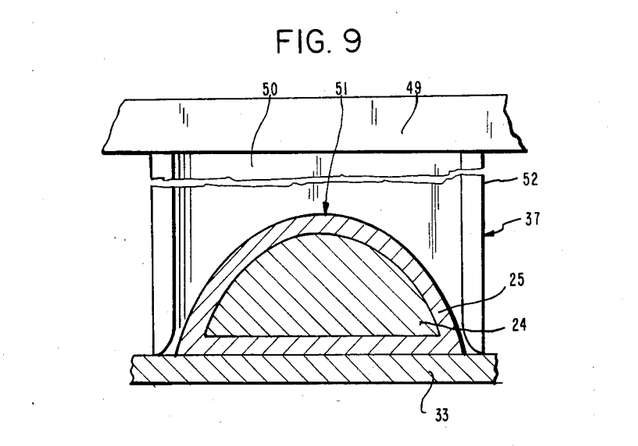
FIG. 9 is a sectional view taken along line 9—9 on FIG. 8 further illustrating the final effect of the knives on the extrudate rope.
Figure 10:
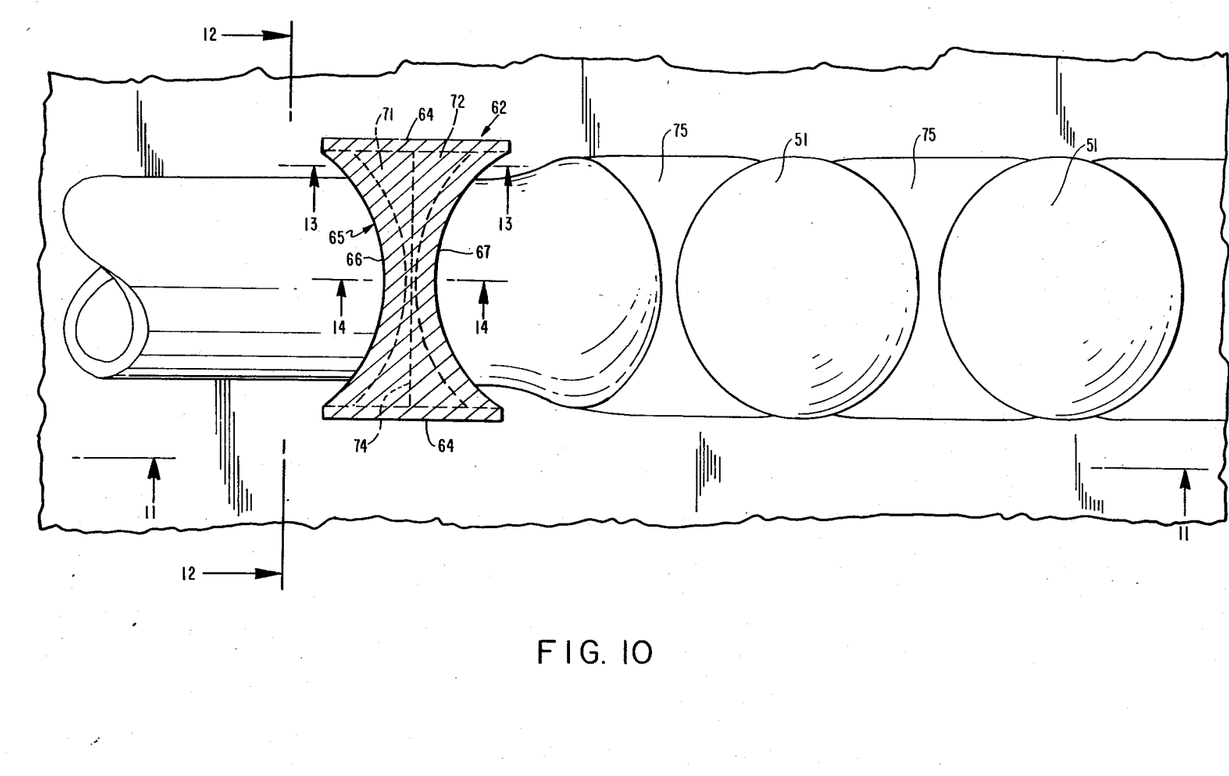
FIG. 10 is a plan view similar to FIG. 2, illustrating a modified cutter construction.
Figure 11:
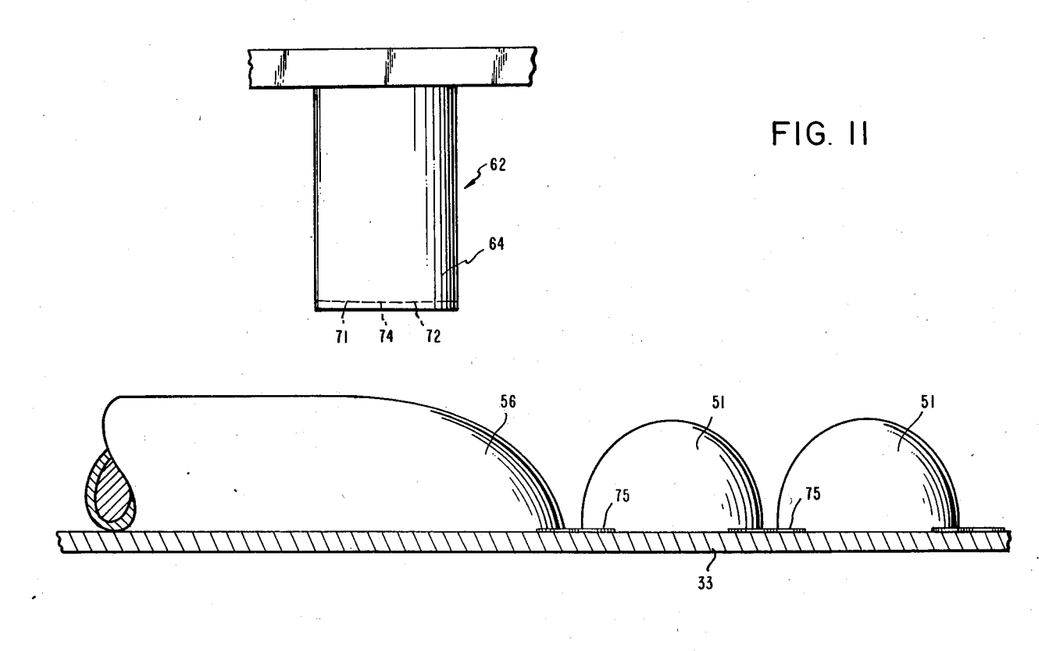
FIG. 11 is an elevational view taken along line 11—11 on FIG. 10.
Figure 12:
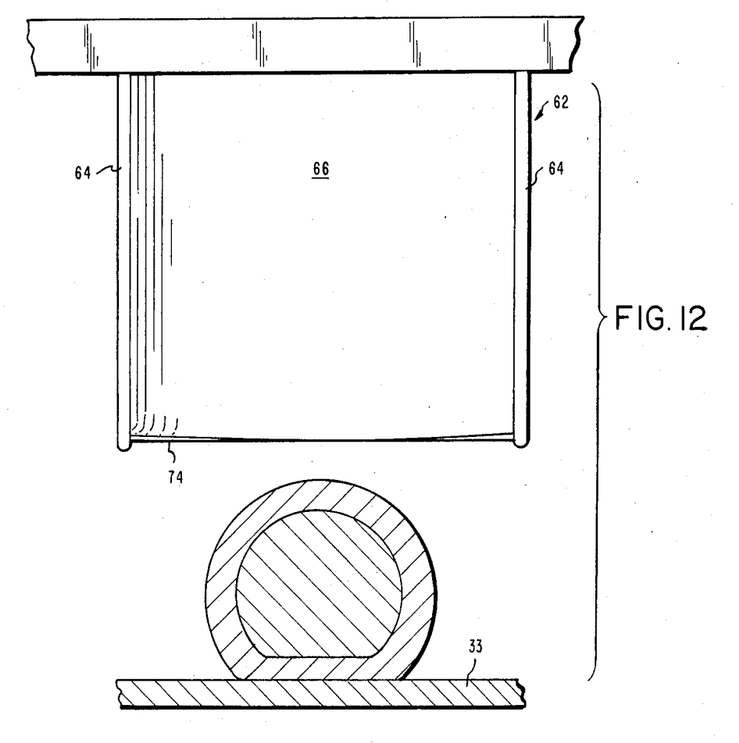
FIG. 12 is an elevational view taken along line 12—12 on FIG. 10.
Figure 13:
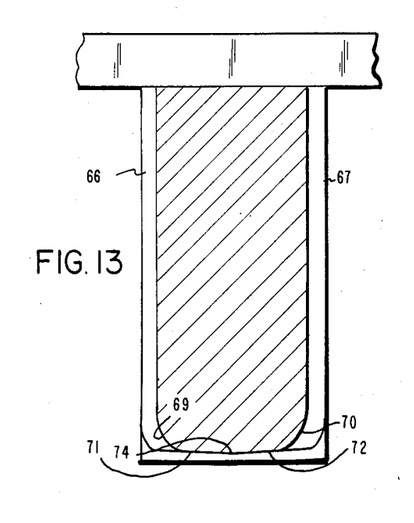
FIGS. 13 and 14 are sectional views of the modified cutter taken respectively along lines 13—13 and 14—14 on FIG. 10.
Figure 14:
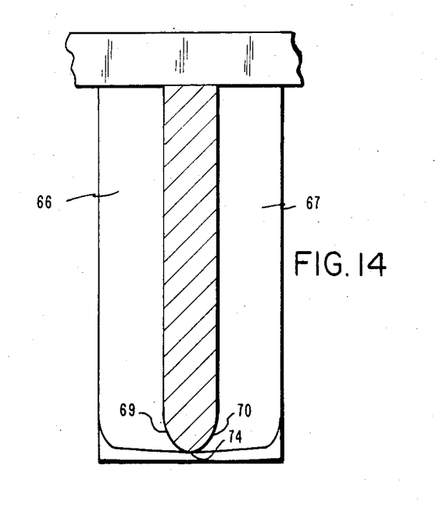

As can be seen in FIGS. 2 and 9, the sealed end 56 of the extrudate rope is flattened and extends transversely to provide a bulge in plan view at the rope end. In FIG. 2, the cutting blades are poised above the ropes before they descend. To the right of the blades, lies the sealed ends 56 of the ropes, the formed dough pieces 51, and triangular waste pieces 57 which represent the edge portions of the ropes 11 that are caught between the surfaces 52 of the blades 37, 38 as the blades descend.

The waste pieces 57 must be removed before the dough pieces enter the oven, otherwise the dough pieces and the waste pieces would spread into each other during the bake, resulting in oddly shaped products.

Figure 3:
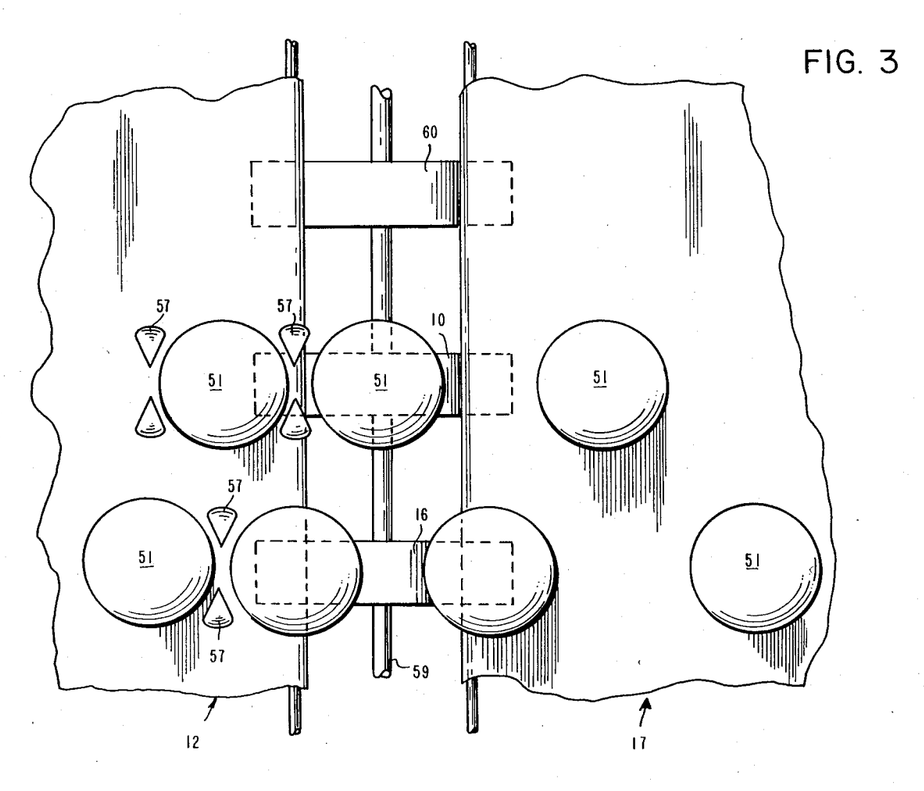
FIG. 3 is a plan view of the conveyor transfer mechanism shown in FIG. 1.

The transfer mechanism 16, as shown in FIGS. 1 and 3 includes a driven shaft 50 and a series of flat edged wheels 60 mounted for rotation with the shaft. One of the wheels 60 is aligned with each row of dough pieces. The wheels 60 are wide enough to support the dough pieces 51 but not wide enough to convey the waste pieces 57. The dough pieces therefore move smoothly from the conveyor 12 to the wheels 60 and to the conveyor 17, while the waste pieces fall into a waste receptacle 61. The conveyor 17, being driven at a greater speed than the conveyor 12, moves a greater distance between receipt of successive dough piece, thereby increasing the spacing between the dough pieces.

Referring now to FIGS. 10-15, there is shown a modification of the invention which reduces the production of waste to an insignificant level. In this embodiment, a cutter block unit 62 is substituted for each set of cutter blades 37, 38. As shown in FIGS. 10-14, the cutter block unit 62 includes edge blades 64 positioned parallel to the rope 11 on each side thereof, and a central blade member 65 extending across the rope 11 between the blades 64. The blade member 65 is formed with concave surfaces 66 and 67 facing upstream and downstream respectively.

The surfaces 66, 67 are formed with inwardly tapered edges 69, 70 respectively. The bottom or land portion of the member 65 is composed of two flat surfaces 71, 72 which meet along a ridge line 74. As viewed in FIGS. 13 and 14, the surfaces 71, 72 slant upwardly from the ridge line 74 at a very shallow angle.

When the cutter block unit 62 moves downwardly into the extrudate rope 11, the tapered edges 69, 70 and the bottom surfaces 71, 72 first squeeze the core material out of that portion of the rope 11 which is beneath the central blade 65, and then begin to squeeze the outer dough out of that area. Near the end of the downward stroke of the cutter unit 62, the edge blades 64 engage the surface of the cotton belt 33 and act as dams to prevent the dough still beneath the blade 65 from being spread transversely across the belt 33. At the end of the stroke, the blades 64 sink into the cotton belt 33 permitting the surfaces 71, 72 to impact against the surface of the belt. As a result, only a very thin smear of dough 75 is not displaced into the dough pieces 51. These dough dough smears 75, as a result of the forces involved, are pressed into the weave of the belt 33 adhere tightly thereto.

Figure 18:
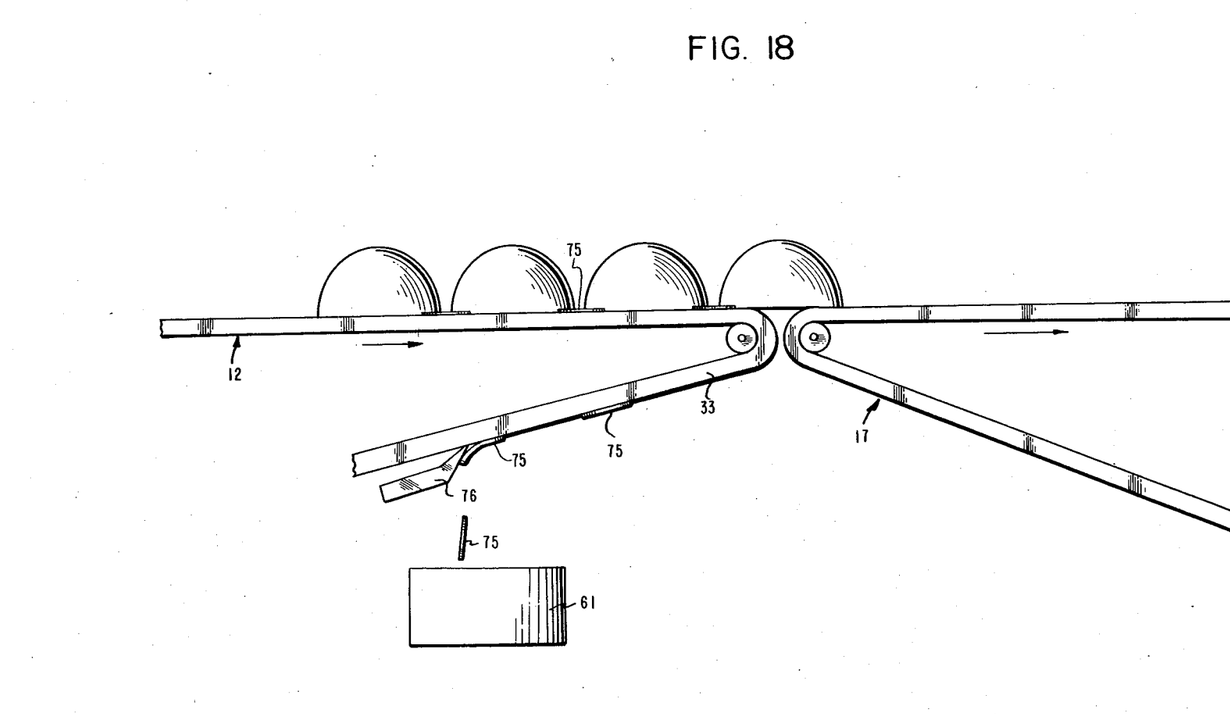
FIG. 18 is an elevational view of the conveyor transfer arrangement used with the modified cutter of FIGS. 10-14.

As shown in FIG. 18, the dough pieces 51 produced by this embodiment are transferred directly from the conveyor 12 to the conveyor 17. The waste pieces 75 remain on the conveyor belt to be removed by a scraper 76, and fall into the waste receptacle 61.

In a preferred embodiment of this modification, the edge blades 64 are 1/16 inch thick and extend 1/32 inch below the ridge line 74. The ridge line 74 is 1/64 inch lower than the highest points on the surfaces 71 and 72, that is, where these surfaces intersect with the surface 69 and 70 at the edge of the blades 64. At the center of the blade 65, the surfaces 71 and 72 each have a width of 1/64 inch. The curvatures and dimensions of the surfaces 66, 67 and 69, 70 are the same as the corresponding surfaces on the cutter blades 37, 38, and the dough pieces 51 produced by each of the embodiments are identical. The waste dough smears 75 are only 0.010 inch thick and therefore do not represent a significant loss. However, these smears consist almost entirely of the outer dough material and therefore they could be recycled into the outer dough hopper to eliminate all waste.

Referring now to FIGS. 19–26, there are shown two further modifications of the present invention for increasing the rate at which dough pieces can be formed.

Reciprocating cutter mechanisms are subject to significant impact loading each time the cutter die strikes the backing plate 15. These impact loadings produce vibrations in the reciprocating cutter mechanism which limit the speed at which it can be run efficiently. The cutter block units shown in FIGS. 19–26 form two dough pieces on each stroke and thereby double the production rate of the reciprocating cutter mechanism 14 without increasing its speed of operation.

Referring to FIGS. 19 to 23, there is shown a cutter block unit 80 formed with a central circular aperature 81 and semi circular concave surfaces 82, 83 facing upstream and downstream respectively. The aperature 81 and the concave surfaces 82,83 form cutter blades 84 therebetween which extend transversely of the extrudate rope 11. The block unit 80 is formed with edge blades 85 running parallel to the rope 11 on each side thereof. The bottom or land portion of the unit 80 is composed of four surfaces 86, 87, 88 & 89. Surfaces 86 & 87 meet along a transverse ridge line 90 and slant upwardly from the ridge line at a very shallow angle. The surfaces 88 and 89 meet along a transverse ridge line 91 and slant upwardly in a similar manner. The surfaces 87 and 88 intersect along a line 92. The aperature 81 and the concave surfaces 82, 84 are formed with inwardly tapered surfaces 94, 95 and 96 respectively.

Figure 19:
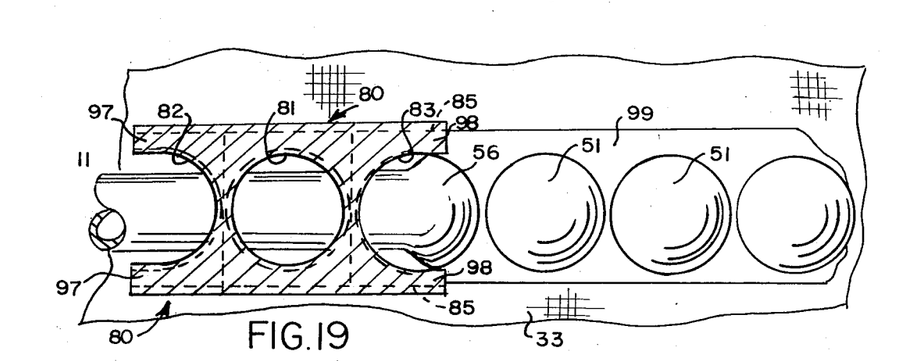
FIG. 19 is a top plan view similar to FIGS. 2 and 10, of another modified cutter construction.
Figure 20:
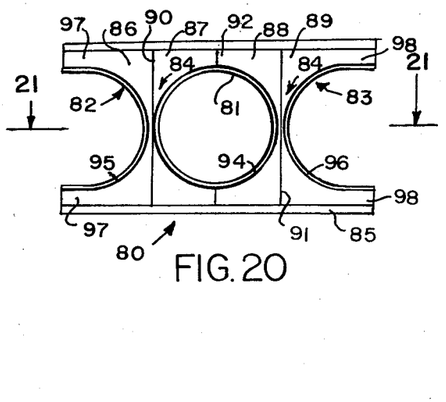
FIG. 20 is a bottom view of the cutter construction shown in FIG. 19.

The cutter block unit 80 is formed with extensions 97, 98 which extend past the semi circular surfaces 82, 84 to provide an overlapping cutting pattern.

When the cutter block unit 80 moves downwardly into the extrudate rope, the ridge lines 90, 91 first contact the rope. The sloped surfaces 86, 87 and 88, 89, and the tapered edges 94–96, first squeeze the core material out of the portions of the rope 11 that is beneath the surfaces 86–89, and then begin to squeeze the outer dough out of that area. Near the end of the downward stroke of the unit 80, the edge blades 85 engage the surface of the cotton belt and act as dams to prevent the dough still beneath the surfaces 86–89 from being spread transversely across the belt. At the end of the stroke, the blades sink into the cotton belt 33 permitting the surfaces 86–89 to impact against the belt. As a result only a very thin smear of dough 99 is not displaced into the dough pieces 51. These dough smears are pressed into the belt and are removed in the manner shown in FIG. 18.

In a preferred embodiment of this modification, the edge blades 85 are about 1/16 inch thick and extend 1/32 inch below the ridge lines 90, 91. The ridge lines 90, 91, are 1/64 inch lower than the junction line 92. At the center of the unit 80, the surfaces 86–89 each have a width of 1/64 inch. The diameter of the aperature 81 and the semi circles 82, 84 is 1¼ inches. The surfaces 94–96 are tapered at 15 degrees.

Figure 21:
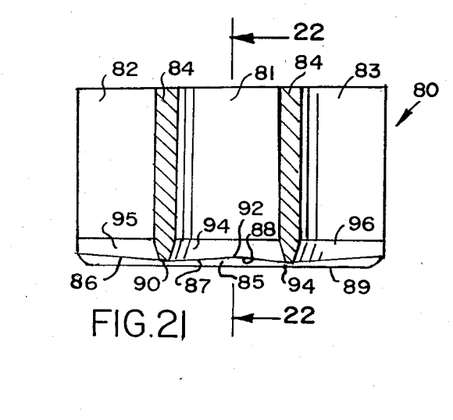
FIG. 21 is a sectional view taken along line 21—21 on FIG. 20.
Figure 22:
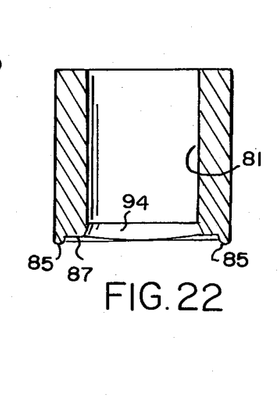
FIG. 22 is a sectional view taken along line 22—22 on FIG. 21.
Figure 23:
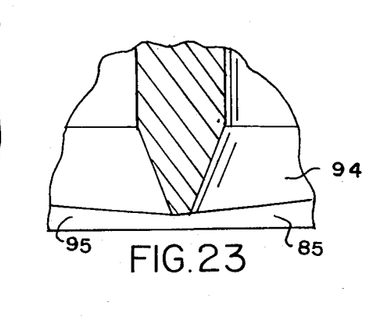
FIG. 23 is an enlargement of a portion of FIG. 21.

On each stroke of the cutter block unit 80, the end of the extrudate rope is cut off and sealed at the concave surface 82. On the same stroke, a dough piece is formed at the concave surface 84 from the sealed end 56 of the rope 11 that was formed on the previous stroke at surface 82. On each stroke, a dough piece is formed at the central aperature 81 between the sealed end of the rope and the dough piece completed at the surface 84.

Between downward strokes of the cutter unit 80, the conveyor belt 33 moves a distance equal to the spacing of two dough pieces 51. The overlap extensions 97 are provided to prevent the formation of laterally extending dough ridges formed by dough flowing outwardly along the edge of the cutter block during the forming of the sealed end 56.

The extension 97 effectively eliminates such ridges, however, should a ridge be formed, the extensions 98 will strike the ridge on the next stroke and squeeze the dough into the dough piece being formed at the surface 84.

Figure 24:
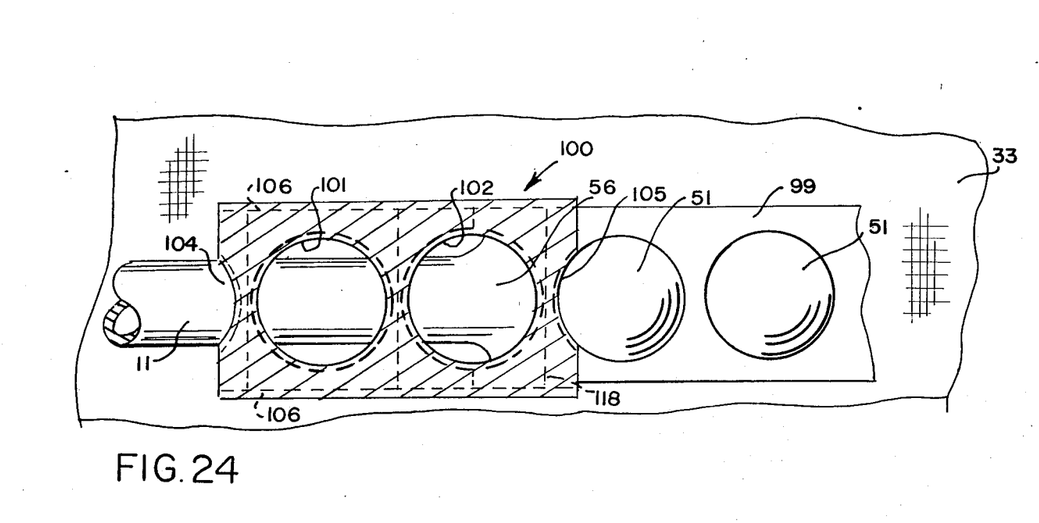
FIG. 24 is a top plan view of another modified cutter construction.
Figure 25:
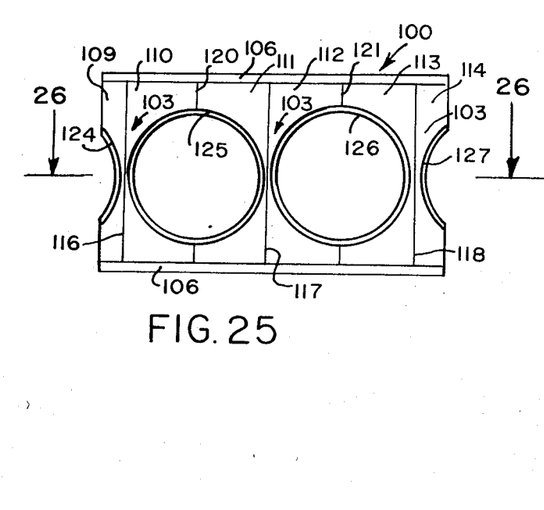
FIG. 25 is a bottom view of the cutter construction show in FIG. 24.
Figure 26:
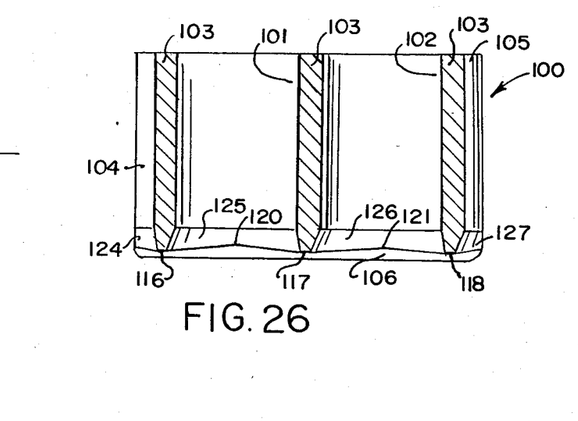
FIG. 26 is a sectional view taken along the line 26—26 on FIG. 25.

In FIGS. 24–26, there is show a cutter block unit 100 formed with two circular aperatures 101, 102 and with concave surfaces 104, 105 on the ends facing upstream and downstream respectively. The aperatures 101, 102 and the concave surfaces 104, 105 form there between three cutter blades 103 therebetween which extend transversely of the extruder rope 11. The unit 100 is formed with edge blades 106 running parallel to the rope 11 on each side thereof. The bottom or land portion of the unit 100 is composed of six surfaces 109–114 and three ridge lines 116–118. The surfaces 109 and 110 slant upwardly from the ridge line 116, the surfaces 111 and 112 slant upwardly from the ridge line 117, and the surfaces 113 and 114 slope upwardly from the ridge line 118. The surfaces 110 and 111 intersect along a line 120, and the surfaces 112 and 113 intersect along a line 121. The aperatures 101, 102 and the concave surfaces 104, 105 are formed with tapered surfaces 124–127 respectively.

On each downward stroke, complete dough pieces are formed at the aperature 101 and 102, and the end of the extrudate rope 11 is cut and sealed at the surface 104. The portion of the block from the ridge line 118 to the end containing the surface 105 provides an overlap section. Between downward strokes of the unit 100, the belt moves a distance equal to the spacing of two dough pieces 51. On each downward stroke, the sealed end 56 of the rope 11 is formed into a dough piece at the aperature 102. The operation of this cutter unit is essentially the same as that of the unit 80 except that the use of the double aperture produces more uniform dough pieces.

In a preferred embodiment of the cutter block unit 100, the edge blades 106 are about 1/16 inch thick and extend 1/32 inch below the ridge lines 116–118. The ridge lines 116–118 are 1/64 inch lower than the junction lines 120, 121. At the center of the unit 100, the surfaces 109–114 each have a width of 1/64 inch. The radius of the aperatures 101, 102 and of the surfaces 104, 105 is ⅜ inch. The surfaces 124–127 are tapered at 15 degrees.

The blades 37, 38 and the cutter block units 62, 80, 100 can be assembled from parts or formed as a unit.

In the dough pieces 51 formed by the preferred embodiments of the present invention, the inner material is totally enveloped by a continuous layer of the outer material which is of substantially uniform thickness throughout. In the baked goods formed by baking these dough pieces, as shown in FIGS. 16–17, the core material is likewise totally covered by a continuous outer layer of substantially uniform thickness.

In the description & the claims, the term "extrudate" refers to extruded material, & the term "rope" is intended to describe the continuous unified nature of the extrudate in the longitudinal direction, and not its cross sectional configuration. The term "dough" includes flour doughs & other materials resembling flour doughs.

The outer dough which forms the tube 25 and the enveloping layer of the dough pieces 51, is preferably a soft cookie dough such as that used in a wire cut or drop cookie, however, the invention contemplates the use of other doughs which are susceptible to extrusion with the type of equipment shown.

The inner or core material may be a dissimilar dough or any of a wide variety of other filling materials.

It will be seen from the foregoing that the present invention provides an improved method and apparatus for producing, in a fast and efficient manner, baked goods and dough pieces having a center of one material enveloped by an outer layer of another material by dividing continuously extruded concentric extrudate ropes being transported on horizontal conveyors.

I claim:

1. The method of forming baked products having dissimilar inner and outer portions wherein the inner portion is enveloped by the outer portion, comprising the steps of: continuously coextruding two dissimilar materials to form an extrudate rope in which the dissimilar materials are arranged to provide an inner core surrounded by an outer tube, said outer tube consisting of a dough; depositing the extrudate rope upon a continuously moving horizontal conveyor; pressing downwardly against the extrudate rope to press it against the conveyor along spaced zones, which extend transversely of the extrudate rope, and during said pressing, pushing adjacent portions of the extrudate rope away from the zones so as to displace the inner core material away from the zones, and continuing said pressing until upper protions of the outer tube have been forced into lower portions thereof to seal the outer tube to itself along said zones and until the extrudate rope has been severed along a line within the part of said zones in which the outer tube has been sealed to itself so as to form individual dough pieces having an inner core thereof enveloped by the outer tube; and baking said dough pieces.

2. The method of forming dough pieces having dissimilar inner and outer portions wherein the inner portions is enveloped by the outer portion comprising the steps of continuously coextruding two dissimilar materials to form an extrudate rope in which the dissimilar materials are arranged to provide an inner core surrounded by an outer tube, said outer tube consisting of a dough; depositing the extrudate rope upon a continuously moving horizontal conveyor; and pressing downwardly against the extrudate rope to press it against the conveyor along spaced zones, which extend transversely of the extrudate rope, and during said pressing, pushing adjacent portions of the extrudate rope away from the zones so as to displace the inner core material away from the zones, and continuing said pressing until upper portions of the outer tube have been forced into lower portions thereof to seal the outer tube to itself along said zones and until the extrudate rope has been severed along a line within the part of said zones in which the outer tube has been sealed to itself so as to form individual dough pieces having an inner core thereof enveloped by the outer tube.

3. The method of claim 1 or 2 wherein said dissimilar materials are dissimilar doughs.

4. The method of claim 1 or 2 wherein said zones are curved to produce rounded ends on the dough pieces.

5. The method of claim 4, wherein said extrudate rope is substantially circular in cross-section, the displacement of said inner core away from said zones deforms the portion of extrudate rope between said zones to increase the width thereof, and the spacing of said zones along the axis of the extrudate rope is sufficiently greater than the diameter of the circular extrudate to produce a dough piece that is substantially circular in plan view.

6. The method of claim 1 or 2, wherein said step for dividing the extrudate rope into individual dough pieces is accomplished by moving blade members downwardly against the extrudate rope, said blade members defining said zones and each having a blunt edge for deforming said extrudate rope to displace said inner core material and seal the outer tube to itself.

7. The method of claim 6 wherein said blunt edges of said blade members have a narrow flat land on the edge thereof outermost with respect to the dough piece formed to separate the dough piece from the extrudate rope along the sealed portion of the outer tube.

8. The method of claim 7, wherein said blade members are curved to produce rounded ends on the dough pieces.

9. The method of claim 1 or 2 wherein the inner core is extruded through a round die and the inner core material contains large particles of a firm nature.

10. The method of claim 9 wherein the inner core material is a dough containing chocolate chips.

* * * * *